(12) United States Patent
Meek, Jr. et al.

(10) Patent No.: US 7,426,425 B2
(45) Date of Patent: Sep. 16, 2008

(54) HIGH CAPACITY DRAWER WITH MECHANICAL INDICATOR FOR A DISPENSING DEVICE

(75) Inventors: Robert B. Meek, Jr., Pittsburgh, PA (US); Kirk A. Young, Pittsburgh, PA (US); Louis S. Conley, Sewickley, PA (US); Eric J. Switalski, Pittsburgh, PA (US); Allen D. Bowers, Pittsburgh, PA (US)

(73) Assignee: McKesson Automation Inc., Richmond, VA (US)

( * ) Notice: Subject to any disclaimer, the term of this patent is extended or adjusted under 35 U.S.C. 154(b) by 0 days.

(21) Appl. No.: 11/369,779

(22) Filed: Mar. 7, 2006

(65) Prior Publication Data

US 2006/0163977 A1 Jul. 27, 2006

Related U.S. Application Data

(62) Division of application No. 10/313,554, filed on Dec. 6, 2002, now Pat. No. 7,052,097.

(51) Int. Cl.
*G06F 17/00* (2006.01)

(52) U.S. Cl. .............. 700/237; 700/231; 700/232; 700/241; 700/242; 700/243; 700/244; 700/236; 312/216; 312/217; 312/218

(58) Field of Classification Search ......... 700/231–244; 312/216–218
See application file for complete search history.

(56) References Cited

U.S. PATENT DOCUMENTS

| 2,964,370 | A |  | 12/1960 | Butler |
|---|---|---|---|---|
| 4,813,753 | A |  | 3/1989 | Relyea |
| 5,346,297 | A |  | 9/1994 | Colson, Jr. et al. |
| 5,408,443 | A |  | 4/1995 | Weinberger |
| 5,520,450 | A |  | 5/1996 | Colson, Jr. et al. |
| 5,661,978 | A | * | 9/1997 | Holmes et al. ............. 62/3.6 |
| 5,745,366 | A | * | 4/1998 | Higham et al. ............ 700/242 |
| 5,805,456 | A | * | 9/1998 | Higham et al. ............ 700/236 |
| 5,883,806 | A |  | 3/1999 | Meador et al. |
| 5,905,653 | A | * | 5/1999 | Higham et al. ............ 700/244 |
| 5,940,306 | A | * | 8/1999 | Gardner et al. ............ 700/244 |
| 6,011,999 | A | * | 1/2000 | Holmes ..................... 700/231 |
| 6,065,819 | A |  | 5/2000 | Holmes et al. |
| 6,073,834 | A | * | 6/2000 | Michael et al. ............ 232/43.1 |
| 6,109,774 | A | * | 8/2000 | Holmes et al. ............ 700/231 |

(Continued)

*Primary Examiner*—Gene O. Crawford
*Assistant Examiner*—Michael K Collins
(74) *Attorney, Agent, or Firm*—Alston & Bird LLP

(57) ABSTRACT

One aspect of the invention relates to an assembly comprising a plurality of bins with a plurality of lids associated therewith. Each of the bins has a lock assembly that includes a catch operable to lock the lid in its closed position and a mechanical indicator responsive to the catch. Another aspect of the invention relates to an automated dispensing cabinet that includes a control computer and a plurality of drawers having a plurality of row assemblies therein. Each row assembly has bins that include a tabbed lid, a lock assembly with a catch operable to engage and disengage the tab, and an indicator responsive to the lock assembly. Methods for dispensing from and restocking the remote dispensing systems are also given, as well as a method for indicating which item is to be dispensed from one of a plurality of bins.

11 Claims, 18 Drawing Sheets

U.S. PATENT DOCUMENTS

| | | | |
|---|---|---|---|
| 6,116,461 A * | 9/2000 | Broadfield et al. | 221/98 |
| 6,151,536 A * | 11/2000 | Arnold et al. | 700/237 |
| 6,338,007 B1 * | 1/2002 | Broadfield et al. | 700/231 |
| 6,385,505 B1 * | 5/2002 | Lipps | 700/231 |
| 6,733,095 B1 | 5/2004 | Rieb | |
| 6,895,304 B2 * | 5/2005 | Spano et al. | 700/237 |
| 2004/0104652 A1 | 6/2004 | Holmes et al. | |
| 2005/0113970 A1 * | 5/2005 | Holmes et al. | 700/242 |

* cited by examiner

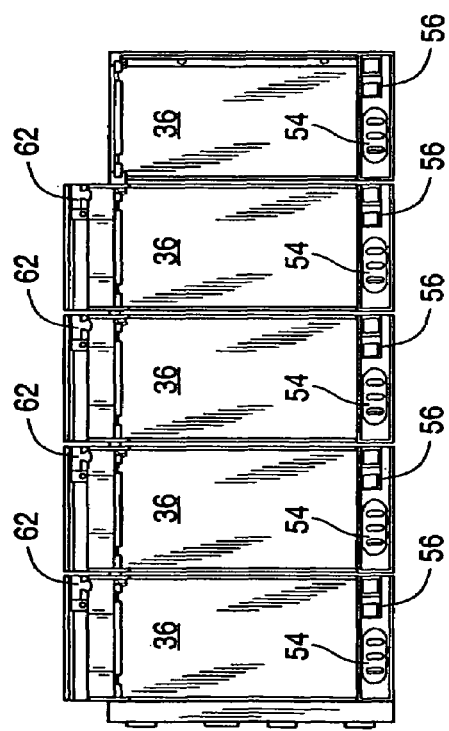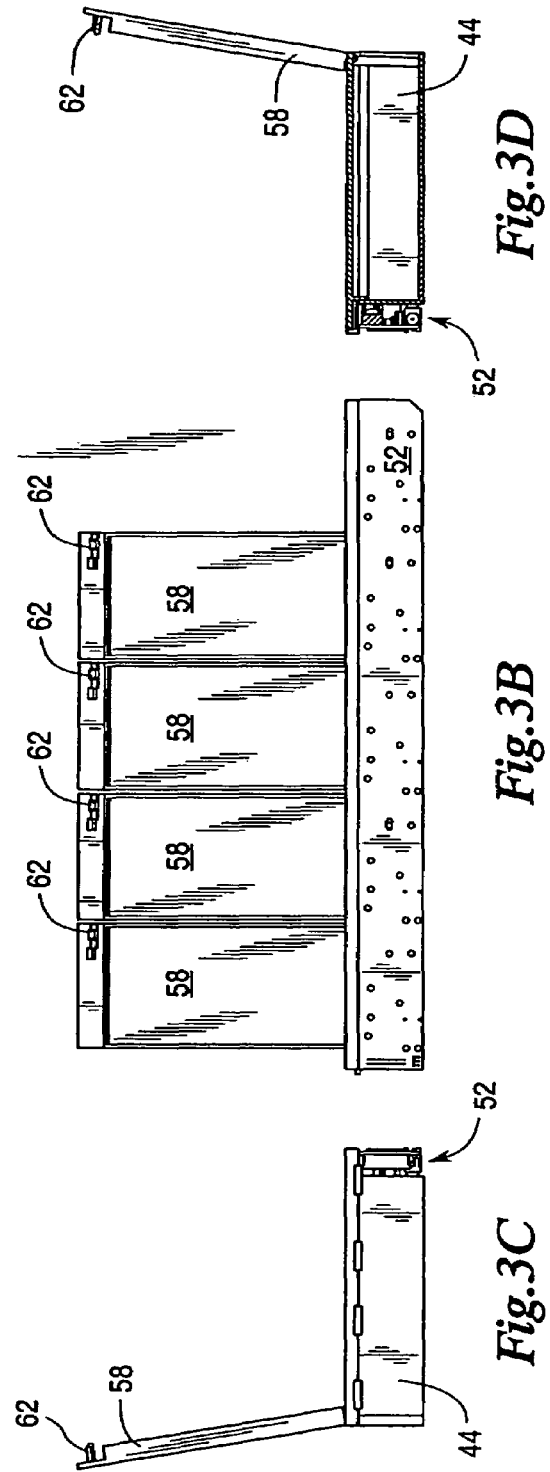

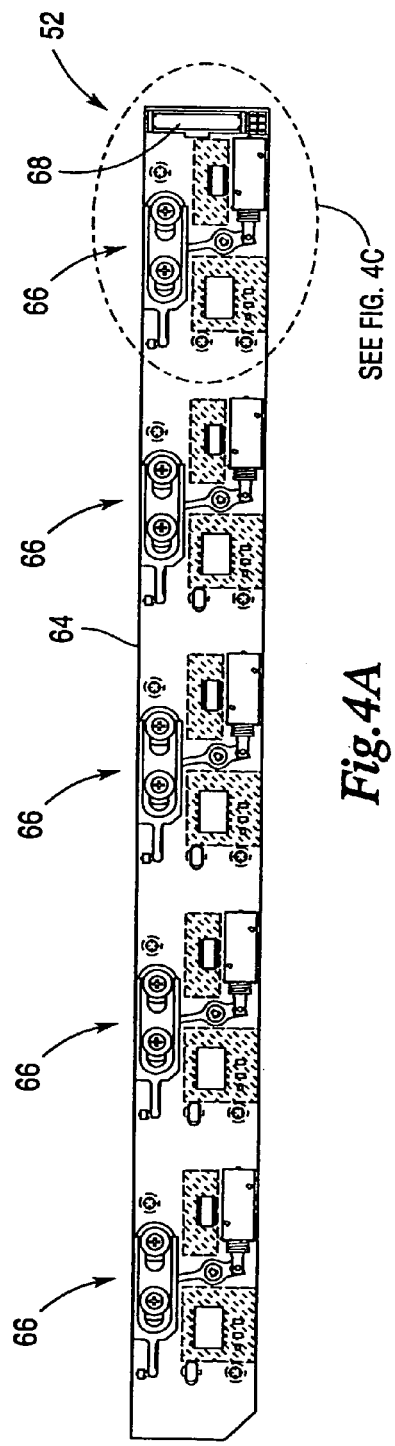
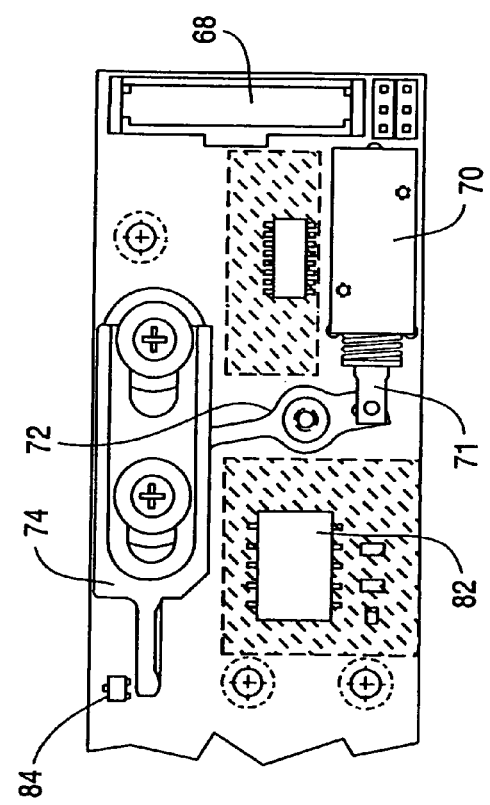
Fig.4A
Fig.4B

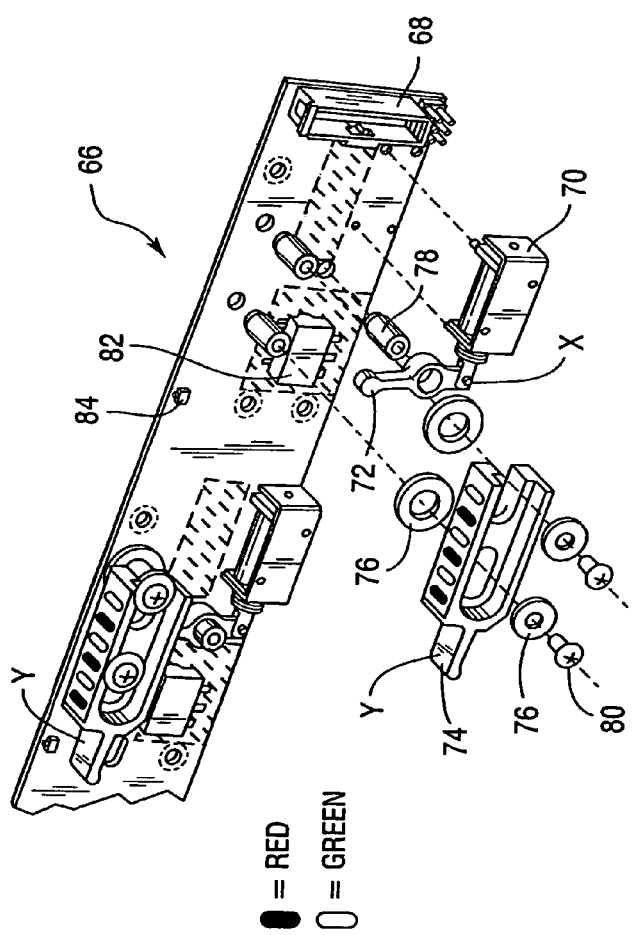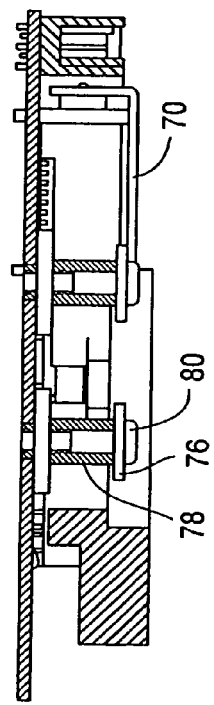
Fig.4C
Fig.4D

HIGH CAPACITY DRAWER WITH MECHANICAL INDICATOR FOR A DISPENSING DEVICE

CROSS-REFERENCE TO RELATED APPLICATIONS

This application is a divisional of U.S. application Ser. No. 10/313,554, filed Dec. 6, 2002 now U.S. Pat. No. 7,052,097, which is hereby incorporated herein in its entirety by reference.

BACKGROUND

1. Field of the Invention

The invention relates generally to an apparatus and method for providing access to items to be dispensed, and relates more particularly to the automatic dispensing of medical supplies. The invention further relates to an apparatus and method for reducing the amount of power consumed by an automatic dispensing system.

2. Description of the Related Art

In typical medical facilities (for example, hospitals, clinics, rest homes, etc), medical supplies are maintained in centralized storage locations and delivered to remote locations (for example, an emergency room, patient ward, etc.) as needed. Once delivered, the medical supplies are then dispensed to a patient. "Medical supply" is intended to include, among others, any item that is administered to or dispensed for a patient or used by a medical caregiver to treat a patient (for example, pharmaceuticals, syringes, sterilized bandages, scalpels, etc.). The invention has been described herein with reference to the dispensing of medical supplies, but it should be recognized that the invention is applicable to fields other than the medical field.

A variety of systems are used for transferring (i.e., from the storage location to the remote locations) and for dispensing (i.e., from the remote locations to the patient) the medical supplies. A system may use, for example, mobile dispensing carts which are stocked at the centralized storage area and then wheeled to the remote location. The medical supplies may then be dispensed directly from the mobile dispensing cart for administering to the patient. Alternatively, a dispensing system may use a stationary dispensing cabinet located at the remote location. Medical supplies are dispensed from the dispensing cabinet for later administering to the patient. A restocking cart, loaded with replacement medical supplies from the centralized storage location, is used to replenish the stationary dispensing cabinet.

Of particular interest to the present invention are dispensing systems which dispense items which require close monitoring and control. A variety of schemes have been proposed for providing secured access to items that are held within such dispensing systems, including locking the items within the carts or allowing access to only one item at a time (commonly referred to as "single dose" or "unit dose" dispensing). In addition to providing secure access, the schemes direct the user to the location within the dispensing system of the item to be dispensed.

One such system is described in related U.S. Pat. No. 5,745,366 entitled "Pharmaceutical Dispensing Device and Methods" and U.S. Pat. No. 5,905,653 entitled "Methods and Devices for Dispensing Pharmaceutical and Medical Supply Items." The system controls access to items to be dispensed and maintains an inventory of the items. The system includes a dispensing unit having a plurality of storage locations distributed within an enclosure. The storage locations may include a multiplicity of lockable receptacles disposed within at least some of the storage locations. The storage locations and the individual lockable receptacles may have sensors and indicator lights associated therewith.

A processor is operable to receive user input and, in response to the input, is operable to activate an indicator light corresponding to the storage location associated with the item to be dispensed. The processor activates locks to prevent access to non-selected storage locations. The processor unlocks the individual receptacle (within the selected storage location) containing the item to be dispensed and activates the indicator light corresponding to the unlocked receptacle. The processor is also connected to receive feedback signals from the receptacle-associated sensors, such that when the unlocked receptacle is opened by a user, a feedback signal is sent to the processor indicating that the item has been dispensed.

Another such system is described in related U.S. Pat. No. 6,109,774 entitled "Drawer Operating System" and U.S. Pat. No. 6,065,819 entitled "Jerk-Resistant Drawer Operation System." The patents disclose a drawer operating system for controlling a plurality of elongated drawers having a plurality of bins consecutive with one another along a sliding direction for holding various dispensable items. The drawers are housed in an array in a cabinet, each drawer arranged to move independently between a closed position and graduated, progressively opened positions to allow access to one or more bins and the contents stored therein. The system controls access to the bins by only allowing the drawer to travel the distance necessary to expose the next bin containing the item. For example, if a drawer has five bins each containing the desired item, the system will only allow the drawer to move to a position in which the first bin is exposed. After the first bin is emptied, the system will only allow the drawer to move to a position in which the second bin is exposed. The process may be repeated until all five bins are emptied. The system includes a keyboard for inputting coded information concerning the particular item needed and information as to the party entering the information.

U.S. Pat. No. 6,011,999 entitled "Apparatus for Controlled Dispensing of Pharmaceutical and Medical Supplies" discloses a system for controlled dispensing of pharmaceutical and medical supplies. The system includes a cabinet having a plurality of drawers, each having a plurality of receptacles. Each receptacle is sized to hold one item and has an identifier associated therewith. Locks are provided for securing the lid. The locks include an electrically responsive actuator wire, which in response to an electrical current supplied to the electrically responsive actuator wire, causes the lock to engage and disengage the lid. A processor is in communication with the locks and is configured to send a signal to the electrically responsive actuator wire to actuate the lid. The lid is spring biased and includes a colored indicator on an inner portion of the lid, such that when unlocked, the lid pops open and the indicator is exposed.

U.S. Pat. No. 6,116,461 entitled "Method and Apparatus for the Dispensing of Drugs" discloses another dispensing system. The system includes modular receptacles which are filled and transported to remote automatic dispensing machines for later retrieval and distribution. The system includes the loading, refilling, and replacement of the modular receptacles at various stages in the process of the invention. The system includes a receptacle having a lockable lid. When required an electronic circuit causes a latch to be actuated, thus opening the lockable lid. The lid has a spring in the hinge assembly which pushes the lid open when the latch is freed, thus indicating to the user the correct receptacle.

U.S. Pat. No. 5,520,450 discloses a supply station with an internal computer. The supply station is comprised of a cabinet having a plurality of lockable doors. Information is provided to the computer which unlocks the doors and simultaneously and automatically updates a patient's record, billing information and hospital inventory. Relevant data may be displayed on a display or printed on a sheet of paper by a printer connected to the computer.

U.S. Pat. No. 5,346,297 discloses an auxiliary storage and dispensing unit for use with a computer-controlled supply and medication dispenser station. The dispensing unit includes a cabinet having a plurality of lockable doors, a device for interconnecting one or more of the doors to allow access to the cabinet and a door unlocking device interconnected to the computer-controlled station for selectively unlocking one or more of the doors as a function of information inputted to the station.

Computer controlled dispensing systems, such as those discussed above, have been developed in response to a number of problems existing in medical facilities. Computer controlled dispensing systems, for example, address problems such as the removal of medications by unauthorized personnel, dispensing the wrong medication for a patient, inaccurate record keeping, etc.

The AcuDose-Rx dispensing cabinet available from McKesson Automation Inc. of Pittsburgh, Pa. is an example of a computer controlled cabinet programmed to address the aforementioned problems. A user is required to logon to the computer (thereby identifying who is removing medications). After identifying a patient, the user is presented with a list of medications that have been approved for administering to the identified patient (thereby addressing the problem of incorrect dispensing). Records are kept for each dispensing event thereby creating an audit trail.

As discussed above, a variety of different storage options are available for dispensing cabinets to ensure the safe and accurate dispensing and administration of medications. These include, but are not limited to, drawers with individual locking pockets which provide access to only one medication in a drawer at any given time; unit-dose dispensing drawers, which provide access to one "unit-of-use" of a medication at any given time, and open matrix drawers, which consist of a plurality of open pockets and which provide access to multiple medications at any given time.

While such systems provide for access controlled dispensing, most require large amounts of power to keep the compartments locked. Furthermore, systems using lighted indicators require additional power, control circuitry, and wiring. In contrast, systems using non-lighted indicators rely on the drawer or lid to "spring" open. If an item is caught on the drawer or lid, an increased risk is encountered that the item will become airborne when the drawer or lid is opened. The airborne item may become lost or may strike a user.

Thus, a need exists for a secure unit dose dispensing cabinet that requires less power to operate and provides a mechanical indicator means for notifying the user of correct location of the item to be dispensed without "springing" open a drawer or lid. Additionally, there exists a need for a safer, less error-prone dispensing and replenishment system.

SUMMARY

One aspect of the present invention relates to an assembly comprising a plurality of bins, a plurality of lids each associated with one of the plurality of bins, wherein each of the bins has a notched tab and a touch latch. The notched tab and the touch latch are in one of an engaged state and a disengaged state when said lid is in a closed position. The assembly includes a lock assembly including a catch operable to prevent the notched tab and the touch latch from changing state and a mechanical indicator responsive to the catch.

Another aspect of the present invention relates to an automated dispensing cabinet, comprising a plurality of drawers, wherein at least one of the drawers includes a plurality of row assemblies, each of the row assemblies having a plurality of bins. Each of the plurality of bins includes a lid having a tab attached thereto, a touch latch operable to one of engage and disengage the tab when the lid is in a closed position, a lock assembly including a catch operable to prevent the notched tab and the touch latch from one of engaging and disengaging, and a mechanical indicator responsive to the lock assembly and viewable when the lid is in a closed position. The automated dispensing cabinet also includes a control computer operable to lock and unlock the plurality of drawers and to control the position of the catch of each of the bins.

Additionally, an aspect of the present invention relates to a method for dispensing an item contained in remote dispensing system. The method comprises granting a user access to the remote dispensing system having a plurality of lockable drawers with a plurality of lockable bins, accepting dispensing information from the user, unlocking at least one of the plurality of drawers, wherein the unlocked drawer contains an item to be dispensed, unlocking at least one of the plurality of bins located within the unlocked drawer while changing the state of a mechanical indicator associated with a bin that has been unlocked, verifying that the user has closed the unlocked bin, and locking the at least one of the plurality of bins and the at least one of the plurality of drawers.

Another aspect of the present invention relates to a method for restocking items contained in a remote dispensing system including a cabinet having with a plurality of drawers, at least one of the plurality of drawers having a plurality of bin row assemblies. The method comprises selecting a bin row assembly, opening the drawer containing the bin row assembly, identifying the selected bin row assembly, removing the selected bin row assembly from the drawer, inserting a restocked bin row assembly in place of the removed selected bin row assembly.

Yet another aspect of the present invention relates to an assembly comprising a plurality of bins, a plurality of lids, each lid being associated with one of the plurality of bins, each of the bins having a notched tab, a lock assembly including a catch operable to one of engage or disengage the notched tab when the lid is in a closed position, and a mechanical indicator responsive to the catch.

Those advantages and benefits, and others, will be apparent from the Detailed Description below.

BRIEF DESCRIPTION OF THE DRAWINGS

To enable the present invention to be easily understood and readily practiced, the present invention will now be described for purposes of illustration and not limitation, in connection with the following figures wherein:

FIG. 3B is a front view of a the bin row assembly of FIG. 3A according to an embodiment of the present invention.

FIGS. 3C and 3D are left and right side views, respectively, of the bin row assembly of FIG. 3A according to an embodiment of the present invention.

FIG. 3E is a top view of the bin row assembly of FIG. 3A according to an embodiment of the present invention.

FIG. 4A illustrates a power control circuit board for the bin row assembly of FIG. 3A according to one embodiment of the present invention.

FIG. 4B is a detailed view of a portion of the power control board for the bin row assembly illustrated in FIG. 4A according to one embodiment of the present invention.

FIG. 4C is an exploded view of a portion of the power control board for the bin row assembly of FIG. 3A according to one embodiment of the present invention.

FIG. 4D is a sectional view taken along the lines A-A of the portion of the power control board for the bin row assembly illustrated in FIG. 4B.

DETAILED DESCRIPTION

Figure 1:
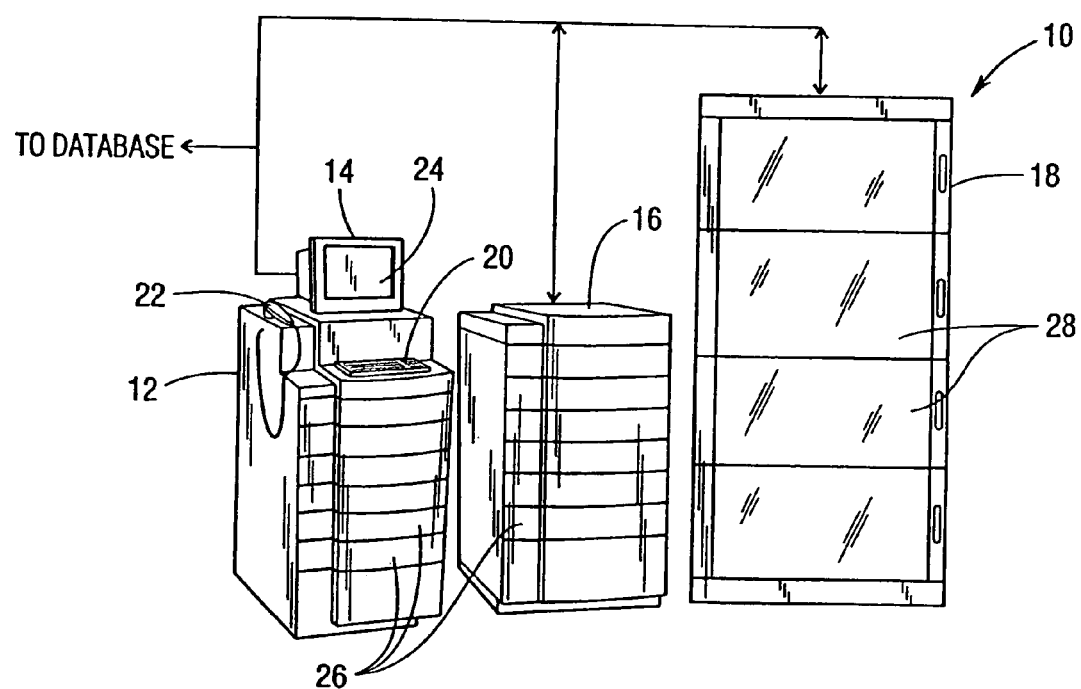
FIG. 1 is a perspective view of a dispensing system located at a decentralized location according to one embodiment of the present invention.

FIG. 1 is a perspective view of a remote dispensing system 10 located at a decentralized location according to one embodiment of the present invention. The system 10 illustrated in FIG. 1 may be comprised of, for example, an AcuDose-Rx™ cabinet 12 (available from McKesson Automation inc., 700 Waterfront Drive, Pittsburgh, Pa.) having a control computer 14, and an AcuDose-Rx™ auxiliary cabinet 16. A supply tower 18 is also illustrated. The control computer 14 controls the operation of the cabinet 12, auxiliary cabinet 16, and supply tower 18.

The control computer 14 may include a memory device (not shown, such as a disk drive, tape drive, CD-ROM drive, etc.) having a local database. The local database may contain inventory, user, and patient information (among others). Alternatively, the control computer 14 may be in communication with another computer (for example, located at the centralized storage location) having a central database which contains the inventory, user, and patient information (among others).

The control computer 14 accepts entry of inventory, user, patient, and other information via a keyboard 20, scanning device 22, and datalink (not shown), among others. The control computer 14, in programmed interaction with the entered information, provides output information to a display 24, printer (not shown), etc. and provides output control signals to the cabinet 12, auxiliary cabinet 16, and supply tower 18, etc.

The control computer 14 may be programmed to regulate access to the system's cabinets 12, 16 and supply tower 18 and to generate records related to access, inventory, etc. The records may be stored in the local database, displayed on the display 24, printed by a printer unit, or transmitted to a central database (among others). The control computer 14 may be preprogrammed with appropriate information regarding the medication types associated with, and their exact location within, each cabinet 12, auxiliary cabinet 16 and supply tower 18. The programming may, for example, be entered directly into the control computer 14 or downloaded from the central database.

As will be discussed in greater detail in conjunction with FIGS. 5 and 6, a user logs onto the control computer 14 to perform a dispensing operation. After log-on, patient information and information regarding items to be dispensed are entered. Based on the entered information, the appropriate drawers 26 in the cabinet 12 and the auxiliary cabinet 16, and various doors 28 on the supply tower 18 are unlocked. The user then accesses the unlocked drawers 26 and doors 28 and removes the appropriate item. After the item to be dispensed has been removed, its removal is recorded at the control computer 14. The record may be entered manually by the user or automatically by a feedback signal. The user may continue to dispense items for the identified patient, enter patient information for another patient, or logoff.

Entry of information, including log-in, can be performed in a variety of ways with a variety of input devices, for example, using the keyboard 20 and barcode scanning 22. Additional input devices or input means, for example, a touch screen, selecting items from a pick list, RF ID), flash memory, magnetic strips, OCR (none of which are shown), etc., may also be used. The reader will understand that the hardware illustrated in FIG. 1 is exemplary and is illustrated for purposes of demonstrating one type of hardware which may be located at the decentralized location.

The hardware illustrated in FIG. 1 limits access to the items to be dispensed to those individuals who have properly logged on. Thus, the hardware illustrated in FIG. 1 is referred to as a closed system for performing dispensing operations because a dispensing operation cannot be performed unless the user is identified to, and recognized by, the control computer 14.

It should be noted that in the current embodiment, a limited access manual override system is also provided. Access is limited to individuals having keys to the rear of the AcuDose-Rx cabinet 12, AcuDose-Rx auxiliary cabinet 16, and AcuDose-Rx supply tower 18.

Figure 2:
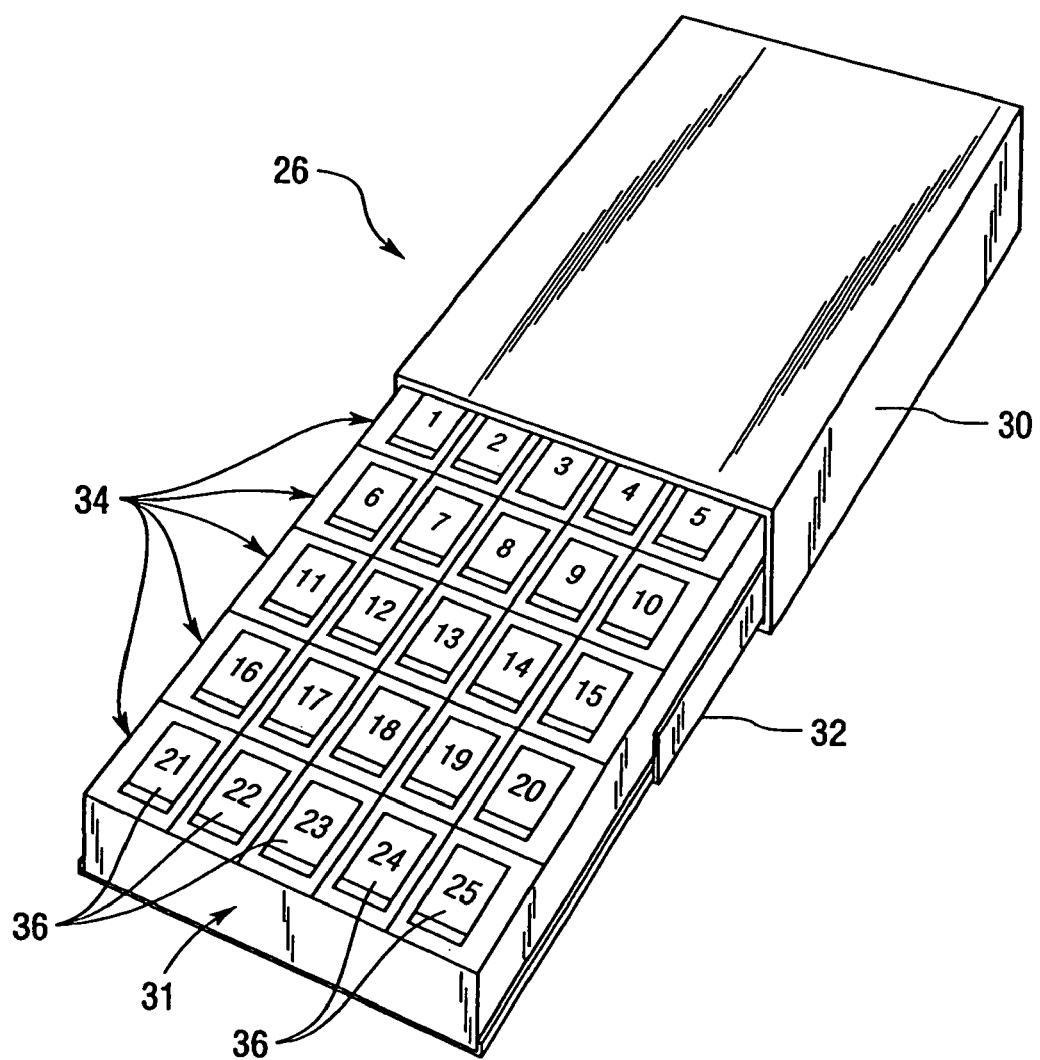
FIG. 2 is a perspective view of a lockable drawer for the dispensing system shown in FIG. 1 according to one embodiment of the present invention.

FIG. 2 is a perspective view of one type of a lockable drawer 26 for use with the dispensing system 10 shown in FIG. 1 according to one embodiment of the present invention. For example, the lockable drawer 26 may be one of the drawers 26 from the AcuDose-Rx™ cabinet 12 or from the auxiliary cabinet 16. Lockable drawer 26 is comprised of a housing 30, a frame 31, and a pair of slides 32 (one of which is seen in FIG. 2) which enable the frame 31 to move relative to the housing 30. As illustrated in FIG. 2, five (5) bin row assemblies 34, each having five (5) bins 36 are secured to the frame 31. The frame 31 and bin row assemblies 34 are slidably moveable between a closed position within the housing 30 and an open position outside of the housing 30. It should be noted that the housing 30 may have a single frame 31 (with a plurality of bin row assemblies 34 secured thereto, for example, as shown in FIG. 2) or with a number of frames 31 (each having a single bin row assembly 34 secured thereto, for example) each mounted on corresponding slides 31.

For simplicity, in the current embodiment the bins 36 are numbered from left-to-right and from back-to-front, relative to the lockable drawer 26. Thus as illustrated, the first bin row assembly 34 is comprised of bins 1-5, the second bin row assembly 34 is comprised of bins 6-10, the third bin row assembly 34 is comprised of bins 11-15, etc. It should be noted that the number of bin row assemblies 34 per drawer 26, the number of bins 36 per bin row assembly 34, and the scheme used to number the bin row assemblies 34 and bins 36 may be altered while remaining within the scope of the present invention.

The bin row assemblies 34, to facilitate restocking procedures or changing of inventory, are separable from the open drawer 26. For example if the bins 6-10 need to be restocked, the second bin row assembly may be removed from the open drawer 26, taken to the central storage location, restocked, and then returned to the open drawer 26, or swapped out with another bin row assembly, i.e., the second bin row assembly may be removed from the open drawer 26 and a previously stocked replacement bin row assembly 34 may be substituted in place of the second bin row assembly.

Figure 3A:
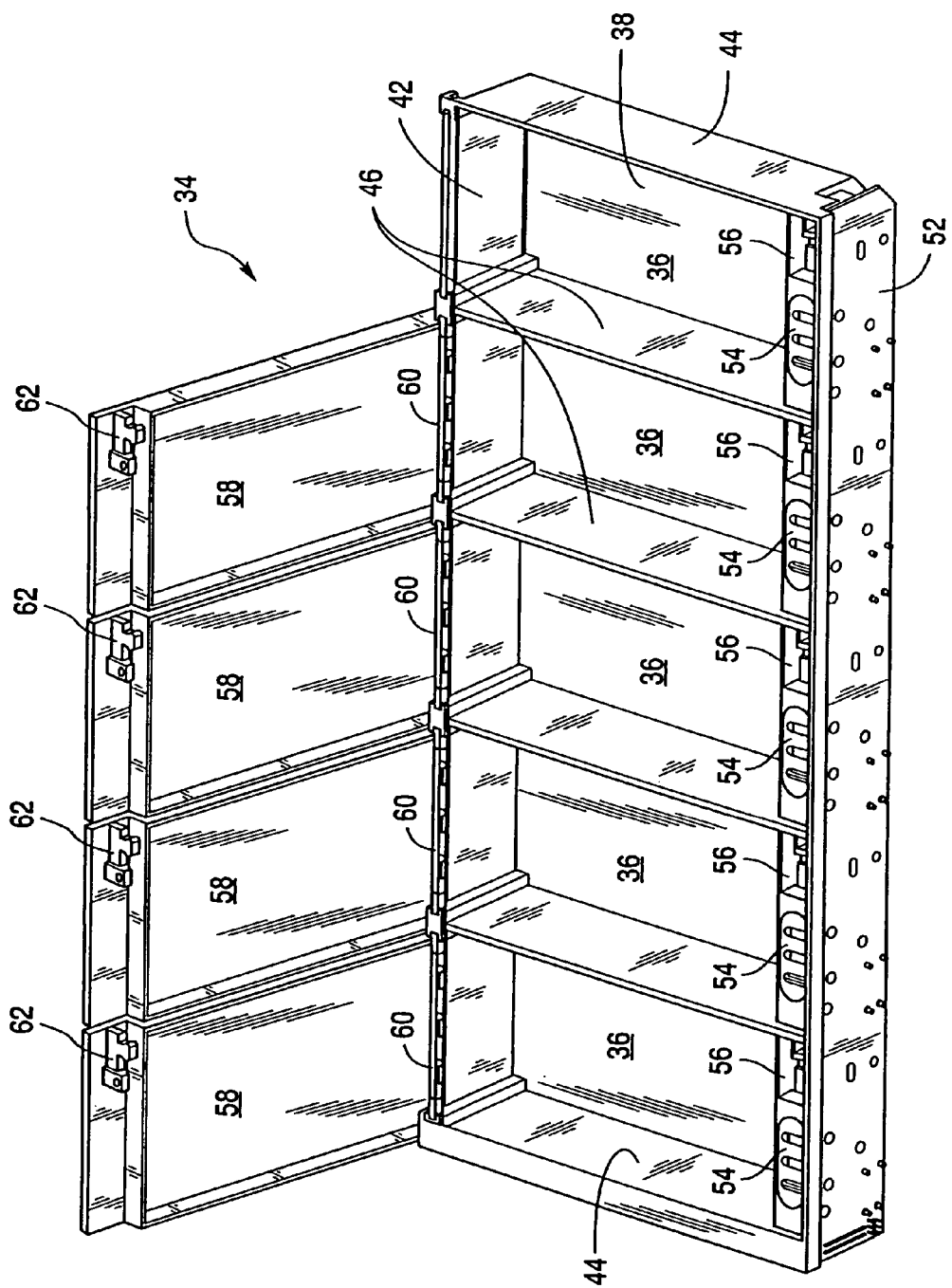
FIG. 3A is a perspective view of a bin row assembly for the lockable drawer shown in FIG. 2 according to one embodiment of the present invention.
Figure 3F:
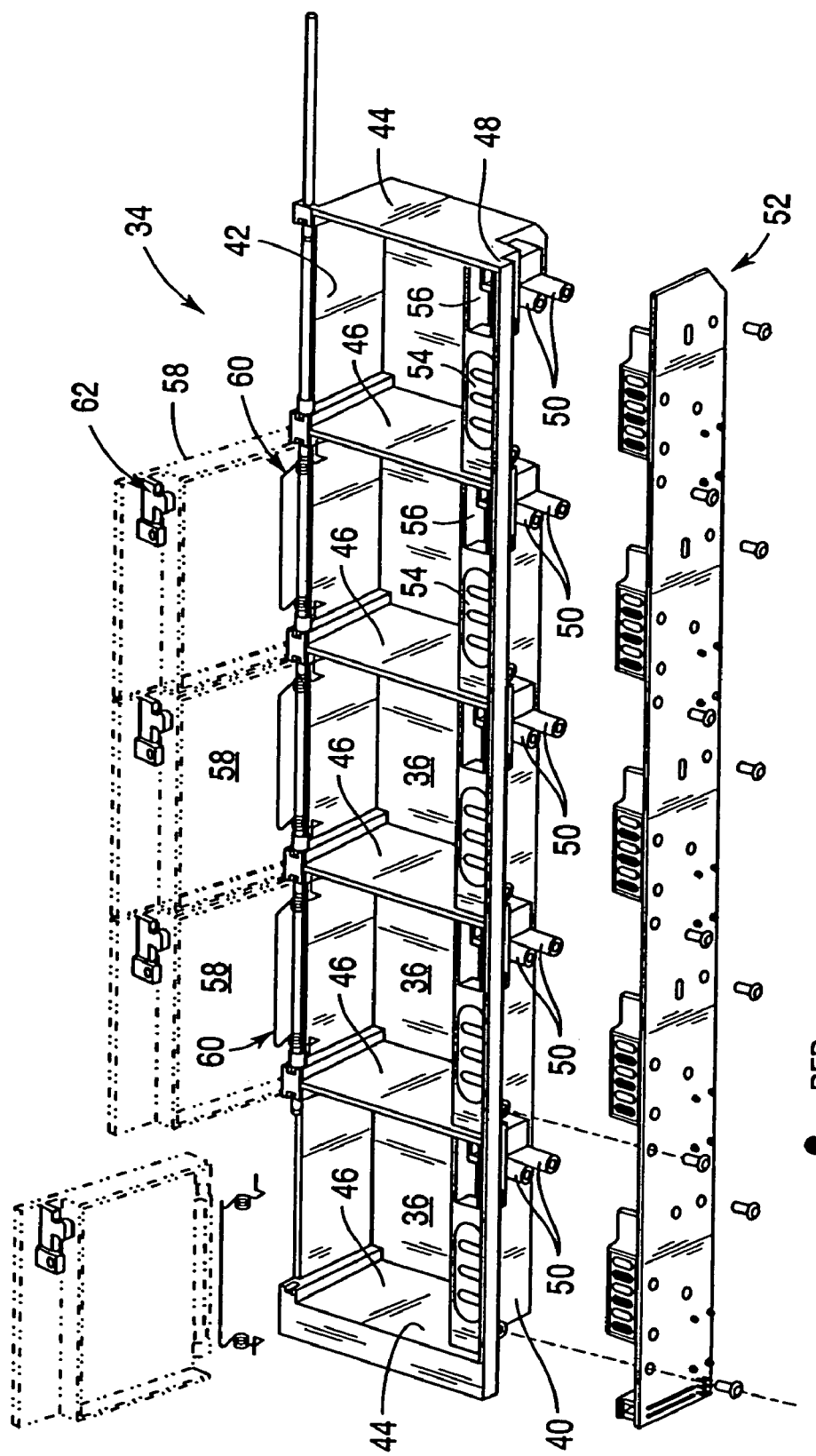
FIG. 3F is an exploded view of the bin row assembly of FIG. 3A according to an embodiment of the present invention.

FIGS. 3A-3F are perspective, front, left side, right side, top, and exploded views, respectively, of a bin row assembly 34 for the dispensing system 10 shown in FIG. 1 according to one embodiment of the present invention. As best seen in FIG. 3E, the bin row assembly 34 is comprised of a base 38, front wall 40, back wall 42, side wall 44, and interior partitions 46. As illustrated, the bin row assembly 34 in the current embodiment contains five (5) bins 36. The front wall 40 includes a lip 48 and one or more spacers 50 configured to receive a power control circuit board 52. The power control circuit board 52 is positioned under the lip 48, abutting the spacers 50, and attached to the front wall 40 (for example, with screws). The lip 48 includes a slotted indicator window 54 and a latching mechanism aperture 56 for each bin 36.

Figure 3G:
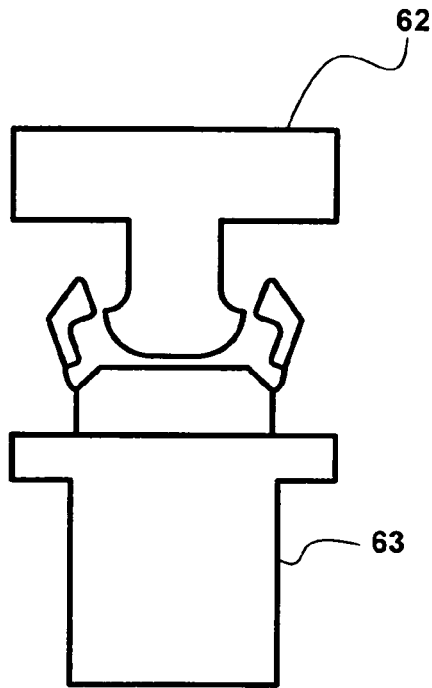
FIGS. 3G and 3H illustrate a touch latch in the unhooked and hooked positions, respectively according to one embodiment of the present invention.
Figure 3H:
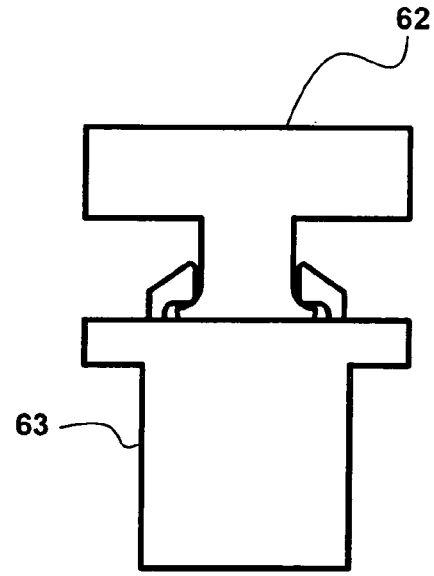

A lid 58 is attached to the back wall 42 of each bin 36 via a hinge mechanism 60. When the lid 58 is in the closed position, a notched tab 62 on the lid 58 enters the aperture 56 in the lip 48 and engages with a touch latch 63 that is mounted to the bin 36 (for example, on the lip 48 under the aperture 56, among others). The touch latch 63, as is known in the art, operates by pushing the notched tab 62 on the lid 58 into the touch latch 63. The notched tab 62 "hooks" with the touch latch 63. Referring briefly to FIG. 3H, a touch latch is illustrated in the hooked position. Thus, the lid 58 is closed it by pushing it down until the touch latch 63 latches and holds it closed. The lid 58 is opened by pushing down on the lid 58 again which causes the touch latch 63 to release (i.e., "unhook") the lid 58. Referring briefly to FIG. 3G, a touch latch is illustrated in the unhooked position.

When closed, the lid 58 may be locked in place by a lock assembly 66 (shown in FIGS. 4A-4C) contained on the power control circuit board 52. In the current embodiment, each bin 36 has a lid 58 associated therewith. Additionally, each lid 58 may be constructed of a transparent material so that both the contents of the bin 36 and the slotted indicator window 54 can be viewed when the lid 58 is in the closed position.

When a lid 58 is in the closed position (i.e., engaged by the touch latch 63) and locked by the lock assembly 66, the slotted indicator window 54 displays a first color (for example, red) indicating to the user that the lid 58 cannot be opened. When the lid 58 is unlocked by the lock assembly 66, the slotted indicator window 54 displays another color (for example, green) indicating to the user that the lid 58 can be opened. It should be noted that in the current embodiment, the indicator can be viewed even when the lid 58 remains closed. It should further be noted that other types of mechanical indicators may be used that permit the indicator to be viewed when the lid 58 is closed while remaining within the scope of the present invention.

It should be noted that an assembly having an alternative latching/locking means may be used while remaining within the scope of the present invention. For example, a lid 58 may have a notched tab 62 that is engaged by the lock assembly 66 without using a touch latch 63. In one instance, the lock assembly's catch 74 may engage the notched tab 62 when the lid is in a closed position.

It should further be noted that, although the bin row assembly 34 of the current embodiment has five (5) bins, the number of bins 36 may be varied while remaining with the scope of the present invention. Additionally, certain bins 36 may not have a lid 58 associated therewith, for example, a bin 36 containing non-regulated supplies may not have a lid 58.

FIG. 4A illustrates a power control circuit board 52 for the bin row assembly 34 of FIG. 3A according to one embodiment of the present invention. FIGS. 4B-4D are detailed, exploded, and sectional views of a portion of the power control circuit board 52 for the bin row assembly 34 illustrated in FIG. 4A according to one embodiment of the present invention.

Referring to FIG. 4A, power control circuit board 52 is comprised of a backing plate 64 with five (5) latch assemblies 66 (i.e., one associated with each bin 36) and a connector 68 attached thereto. The connector 68 is used to connect signal and power conductors for each lock assembly 66 to the system 10. For example, the connector 68 couples with a complimentary connector (not shown) that is in electrical communication with the control computer 14. The complimentary connector in the present embodiment is located on the drawer 26.

As best seen in FIG. 4C, in the current embodiment each locking assembly 66 includes a solenoid 70, pivot arm 72, catch 74. The catch 74, in the current embodiment, includes the mechanical indicator for notifying the user whether the bin 36 is locked or unlocked. The lock assembly 66 may also include a relay 82, Hall-effect sensor 84, as well as associated hardware, for example, flat washers 76, fastener standoff 78, and screws 80, among others.

In the current embodiment, latching solenoids 70 are used. A latching solenoid 70 refers to a solenoid 70 that does not have a default mechanical state and must receive an electrical pulse to change states. For, example in the current embodiment, the catch 74 slides from side to side to lock and unlock the lid 58. When the catch 74 is engaged (i.e., the lid 58 is locked), the notched tab 62 of the lid 58 is prevented from being pushed down far enough to change the state of (i.e., engage or disengage) the touch latch. If power is removed from the latching solenoid 70, the catch 74 remains engaged. The catch 74 remains engaged until a control pulse is applied to the latching solenoid 70. Likewise, when a bin 36 is unlocked, the catch 74 is disengaged. If power is removed from the latching solenoid 70, the catch 74 remains disengaged. The catch 74 remains disengaged until a control pulse is applied to the latching solenoid 70. Thus, the use of latching solenoids 70 reduces the amount of power needed to operate the dispensing system 10. It should be noted that other means for moving the catch 74 (for example, a non-latching solenoid, a motor, a pneumatic or hydraulic cylinder, an actuator, an electromagnet, etc.) may be used while remaining within the scope of the present invention.

Referring now to FIG. 4B, the lock assembly 66 is shown in the locked (i.e., engaged) position. For simplicity, the notched tab 62 and touch latch 63 are not shown in FIG. 4B. When an electrical pulse is applied via the relay 82 to the solenoid 70, the solenoid plunger 71 extends (moves to the left as shown), causing the pivot arm 72 to rotate clockwise about its pivot point. The pivot arm 72, in turn, causes the catch 74 to unlock (i.e., move to the right as shown) the lid 58. When the lock assembly 66 is in the disengaged position and an electrical pulse with opposite polarity is applied to the solenoid 70 via the relay 82, the solenoid plunger 71 retracts (moves to the right as shown), causing the pivot arm 72 to rotate counter-clockwise about its pivot point. The pivot arm 72, in turn, causes the catch 74 to unlock (i.e., move to the left as shown) the lid 58. The Hall-effect sensor 84 produces a feedback signal (that is sent to the control computer 14) indicative of whether the lid 58 is closed or open.

As discussed above, when the lock assembly 66 is engaged, the notched tab 62 of the lid 58 is prevented from being pushed down far enough to change the state of (i.e., engage or disengage) the touch latch 63. Thus, it should be apparent to one skilled in the art that the direction of travel of the catch 74 to lock and unlock the lid may be changed while remaining within the scope of the present invention.

In the current embodiment, the locking/unlocking and the mechanical indication of the bin's status (i.e., locked or unlocked) are combined in a unitary function, i.e., as the bin is locked or unlocked, the mechanical indicator changes state. The catch 74, for example, may have an indicia (such as colors, words, symbols, marks, etc.) representative of whether the catch is engaged (i.e., the bin 36 is locked) or disengaged (i.e., the bin 36 is unlocked). For example as discussed in conjunction with FIGS. 3A-3F, catch 74 may have red colored portions and green colored portions which show through the indicator window 54 when the bin in locked and unlocked, respectively. It should be noted, however, that other mechanical indicia, such as raising a flag or pin, rotating a cylinder having "locked" on one portion and "unlocked" on another portion, turning a dial, etc. may be used while remaining within the scope of the present invention. Also, the function need not be unitary, that is, the bin may be locked or unlocked followed by the mechanical indicator changing state. It should be apparent to one skilled in the art that any mechanical indicator that is responsive to the lock assembly 66 may be used while remaining within the scope of the present invention.

Figure 5:
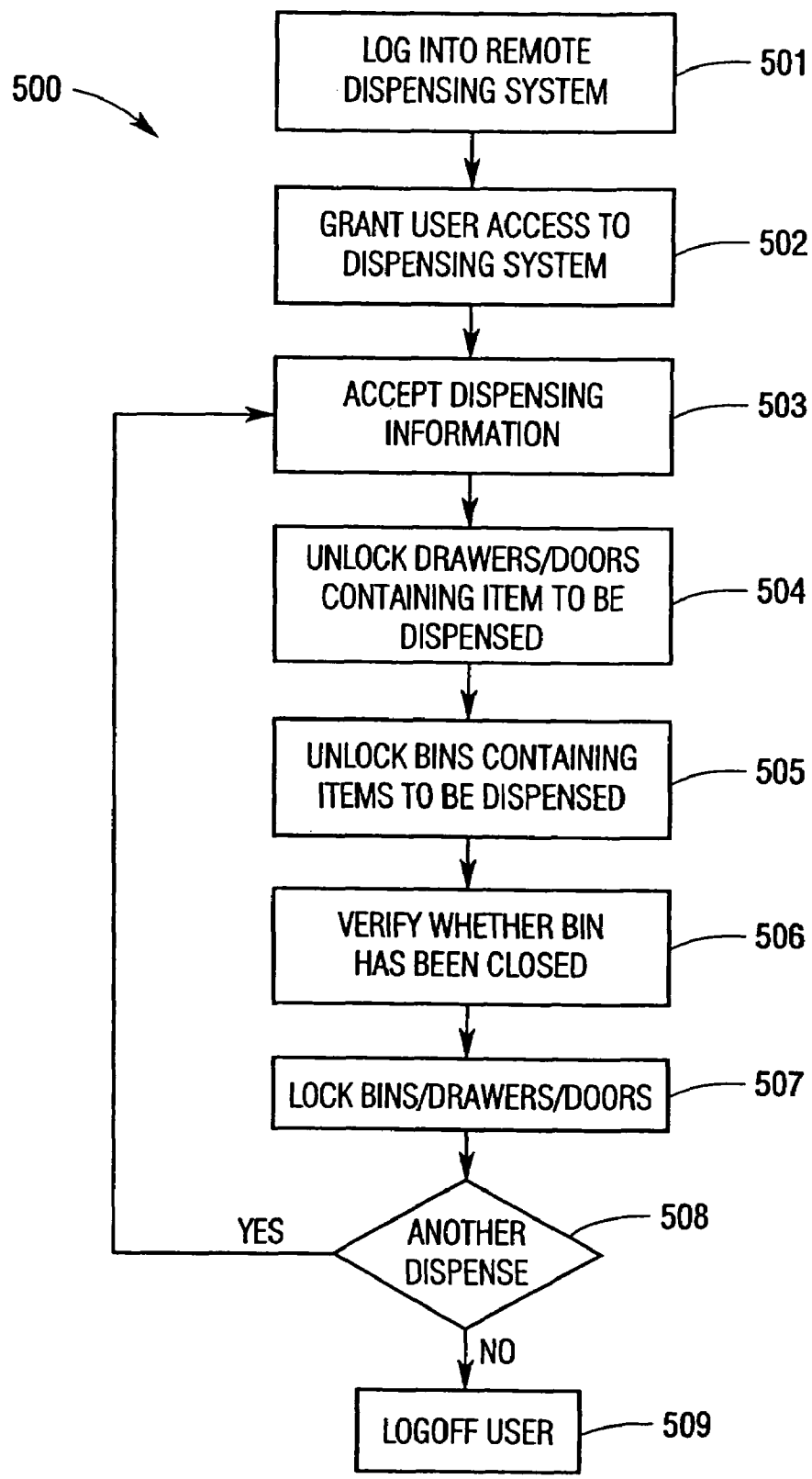
FIG. 5 illustrates an operational process for dispensing items from the remote dispensing system shown in FIG. 1 according to an embodiment of the present invention.

FIG. 5 illustrates an operational process 500 for dispensing items at a remote dispensing system 10 according to an embodiment of the present invention. Operation 500 is initialized by a user logging onto the remote dispensing system's control computer 14 at operation 501. In the current embodiment, the remote dispensing system 10 includes a control computer 14, AcuDose-Rx cabinet 12, AcuDose-Rx auxiliary cabinet 16, and a supply tower 16 as discussed in conjunction with FIG. 1.

After logging onto the control computer 14, the user is granted access to the remote dispensing system 10 in operation 502. In the current embodiment, the access may be either restricted or unrestricted. Restricted access allows the user to access fewer than all of the drawers 26 and bins 36 located at the remote dispensing station 10 and prevents the user from removing some or all of the bin row assemblies 34 from a drawer 26. On the contrary, unrestricted access allows the user access to all of the drawers 26 and bins 34 located at the remote dispensing station 10 and allows the user to removing all of the bin row assemblies 34 from a drawer 26.

The control computer 14 then accepts dispensing information from said user in operation 503. In the current embodiment, dispensing information may include inventory, user, patient, and prescription information, among others. The dispensing information may be entered via a keyboard 20, scanning device 22, and datalink (not shown), among others.

After accepting the dispensing information, the drawers 26 containing the items to be dispensed are unlocked in operation 504. In the current embodiment, the control computer 14, in programmed interaction with the entered information, provides the output control signals for unlocking the drawers 26 of the cabinet 12, auxiliary cabinet 16, and supply tower 18.

The bins 36 within the unlocked drawers 26, which contain the items to be dispensed, are unlocked in operation 505. In the current embodiment, the bins 36 contain a mechanism that not only locks/unlocks the bin 36, but also simultaneously indicates to the user whether the bin 36 is locked or unlocked. In the current embodiment, a mechanical indicator is used which can be viewed when the bin's lid 58 is closed. It should be noted that even when unlocked, the bin's lid 58 remains closed until lifted by the user, or the lid can be spring loaded so the pushing down on an unlocked lid causes the lid to spring up.

Once the bin(s) 36 have been unlocked, the user can remove the desired item and close the bin lid 58. Typically, the user then enters information into computer 14 to create a dispensing record. In the current embodiment, feedback signals are sent from the bins 36 to the control computer. The feedback signals may be used, among others, to verify whether a drawer 26, bin 36, etc. is locked or unlocked, and whether a bin's lid 58 is opened or closed.

After the remote dispensing station 10 verifies that the user has closed the unlocked bin(s) 36 and closed the drawer 26 in operation 506, the closed bins 36 and closed drawer 26 are locked in operation 507. As discussed above, the mechanism used not only locks/unlocks the bin 36, but also simultaneously indicates to the user whether the bin 36 is locked or unlocked. A mechanical indicator is used which can be viewed when the bin's lid 58 is closed.

After the opened bins 36 and drawers 26 are locked in operation 507, the user indicates whether another dispense is desired in operation 508. If another dispense is desired, operational process 600 returns to operation 603 and the user enters new dispensing information. If another dispensing operation is not desired, the user is logged off of the control computer 14 in operation 509.

Figure 6:
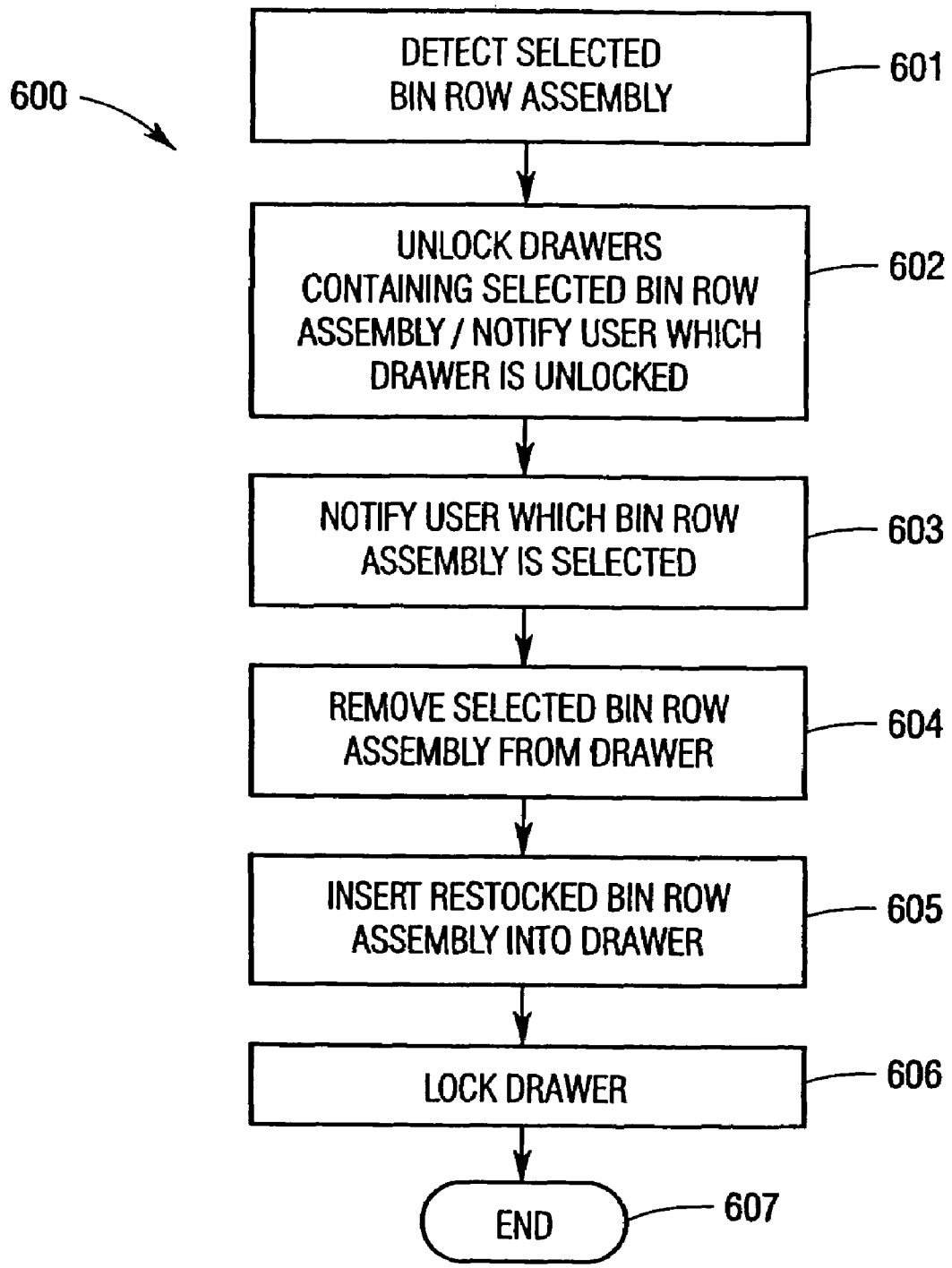
FIG. 6 illustrates an operational process for restocking dispensed items from the remote dispensing system shown in FIG. 1 according to an embodiment of the present invention.

FIG. 6 illustrates an operational process 600 for restocking dispensed items with the remote dispensing system 10 according to an embodiment of the present invention. Operation 600 is initiated by operation 601 when the remote dispensing system 10 detects that a bin row assembly 34 within the remote system 10 is depleted or below par (i.e., below an acceptable inventory level). In the current embodiment, the control computer 14 may be manually notified by a user, notified by a centralized computer, or the control computer 14 may automatically detect, that a bin row assembly 34 has been selected (i.e., it is depleted or below par).

The remote dispensing system 10 then unlocks the drawer 26 containing the selected bin row assembly 34 in operation 602. In the current embodiment, the user is notified of which drawer 26 has been unlocked on the control computer display 14. Alternatively, an indicator located on the cabinet or auxiliary cabinet may also be used to notify the user.

The selected bin row assembly 34, within the unlocked drawer 26, is then identified in operation 603. In the current embodiment, the selected bin row assembly 34 is identified on the control computer display 24. Alternatively, an indicator located on the drawer, cabinet, or auxiliary cabinet may also be used to identify the selected bin row assembly 34.

After the selected bin row assembly 34 has been identified, the user removes the selected bin row assembly 34 from the drawer 26 in operation 604. In one embodiment, the bin row assembly 34 can be secured within the drawer 26 such that a user having restricted access (as discussed in conjunction with FIG. 5) can only remove the selected bin row assembly 34 from the drawer 26 that has been unsecured by the control computer 14. The user having restricted access is unable to remove the bin row assemblies that remain secured.

A restocked bin row assembly 34 is then inserted into the drawer 26 in operation 605. In the current embodiment, the restocked bin row assembly 34 is filled at a centralized storage location. Each bin in the restocked bin row assembly 34 is locked at the centralized storage location, prior to transporting the restocked bin row assembly 34 to the remote dispensing system 10. After the restocked bin row assembly 34 is inserted into the unlocked drawer 26 and the drawer 26 is closed, the control computer 14 locks the drawer 26 in operation 606. Operational process 600 is then terminated in operation 607.

Figure 7A:
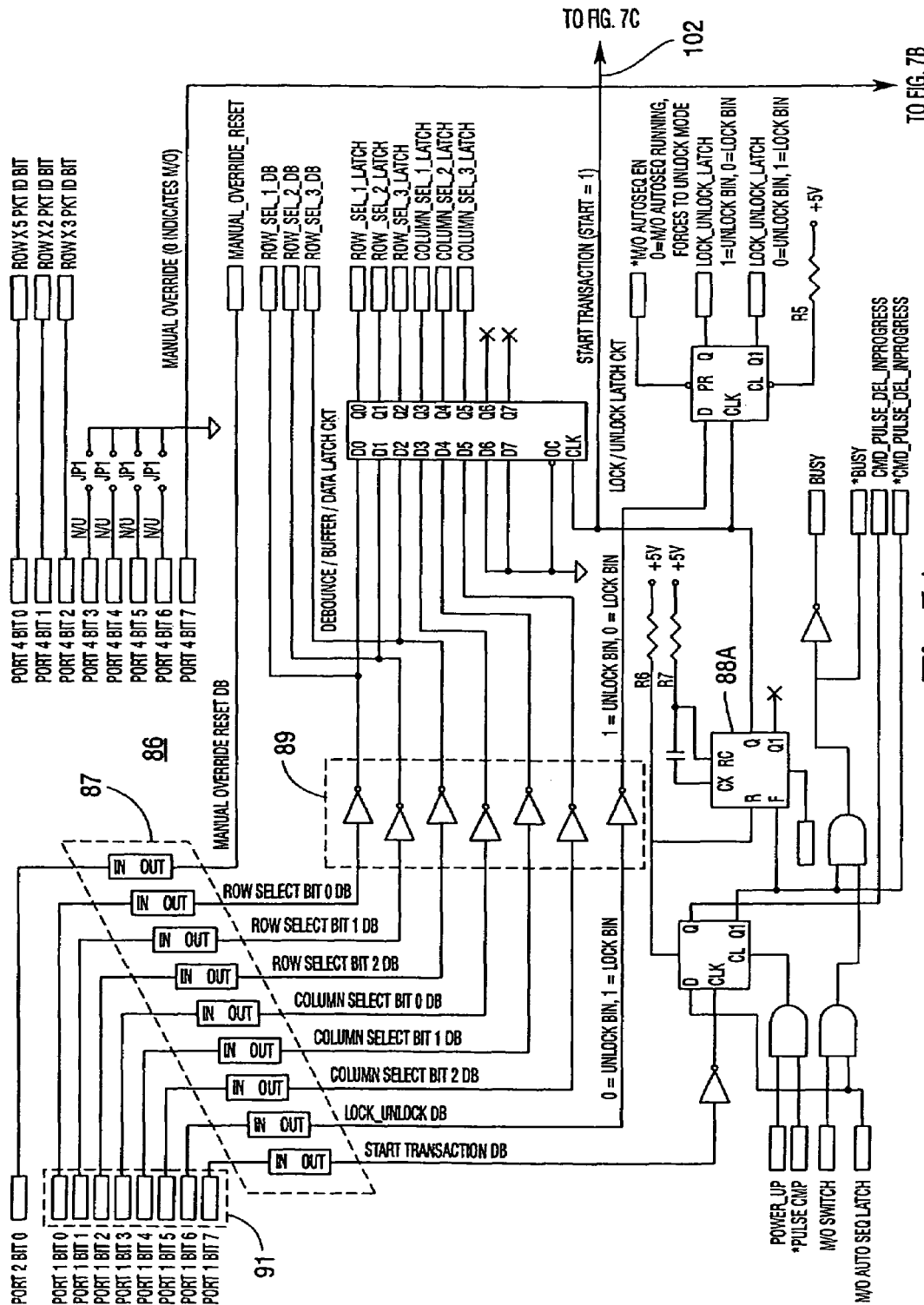
FIGS. 7A-7C are an electrical schematic of an input/output interface circuit and a manually activated override interface circuit for the remote dispensing system illustrated in FIG. 1 according to an embodiment of the present invention.
Figure 7B:
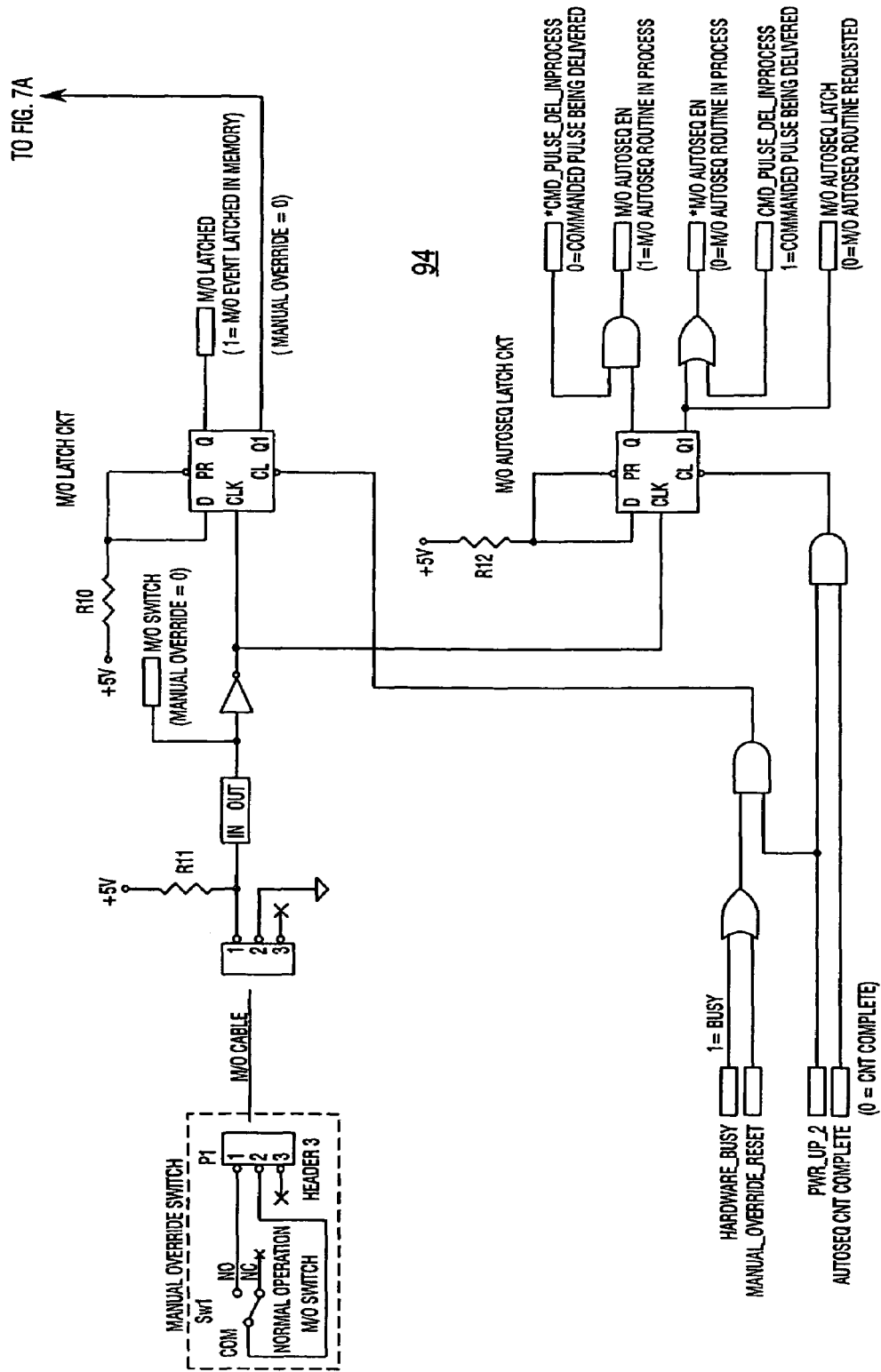
Figure 7C:
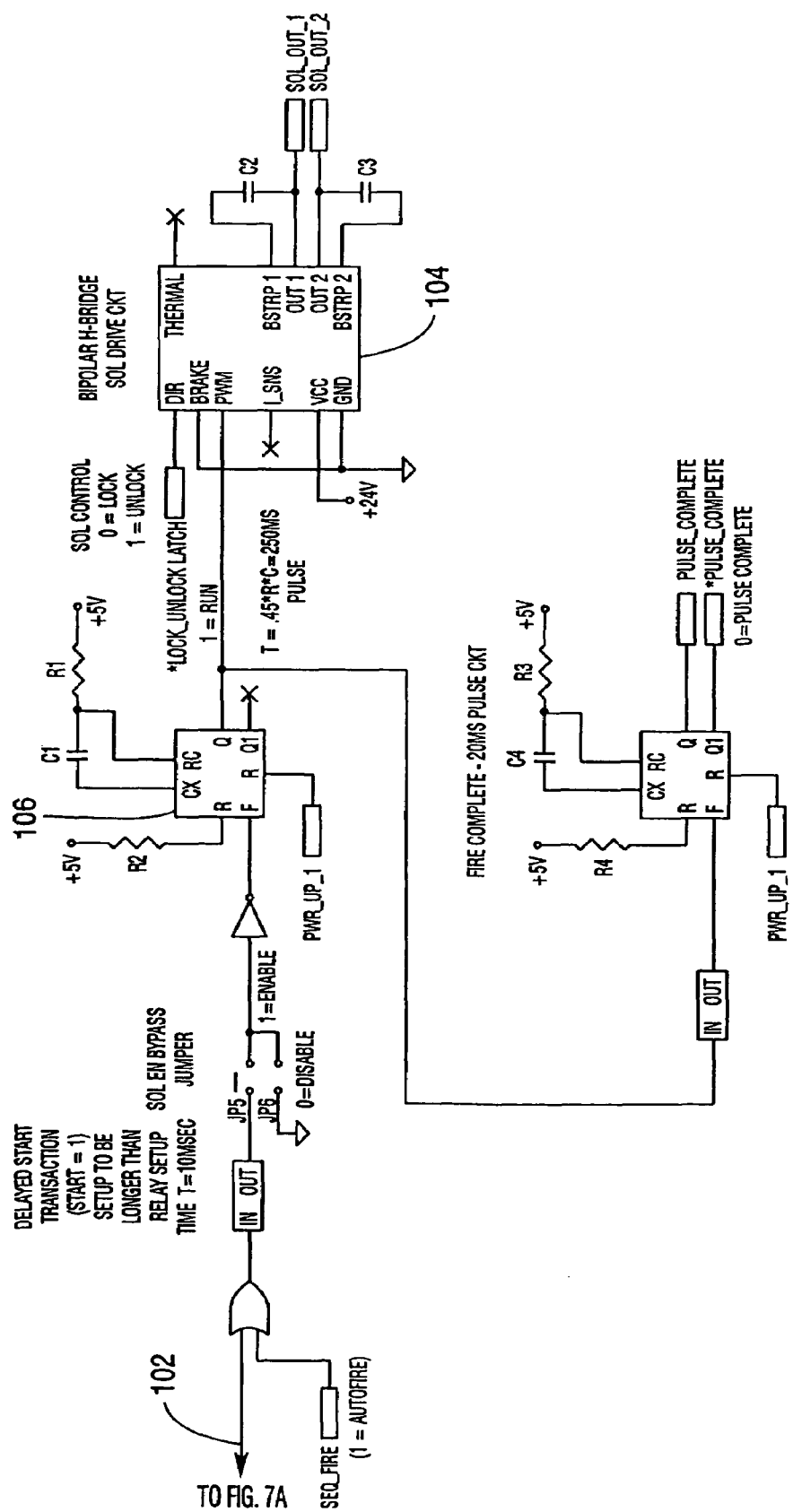

FIGS. 7A-7C are an electrical schematic of an input/output interface circuit 86 and a manual override interface circuit 94 for the remote dispensing system 10 illustrated in FIG. 1 according to an embodiment of the present invention. The input/output interface circuit includes filters 87, flip-flops 88, inverters 89, and buffers 90, among others. Column select and row select input bits on pins 91, sent from control computer 14, are received by the input output interface circuit 86, inverted, buffered and output to a relay select circuit 92 (discussed in conjunction with FIG. 8) via row select and column select pins 93. FIG. 7 also illustrates a manual override interface circuit 94, which in conjunction with a flip-flop 88A, may be used to disable the row and column select inputs 91 should a manual override be instituted. FIG. 7 also illustrates a start transaction bit carried on line 102 which is input to a power drive 104 through a one-shot 106. Finally, a flip-flop 88 is used to generate signals for determining the direction needed to drive the solenoids 70. It should be noted that alternative input/output interface and manual override interface circuits may be used while remaining within the scope of the present invention.

Figure 8A:
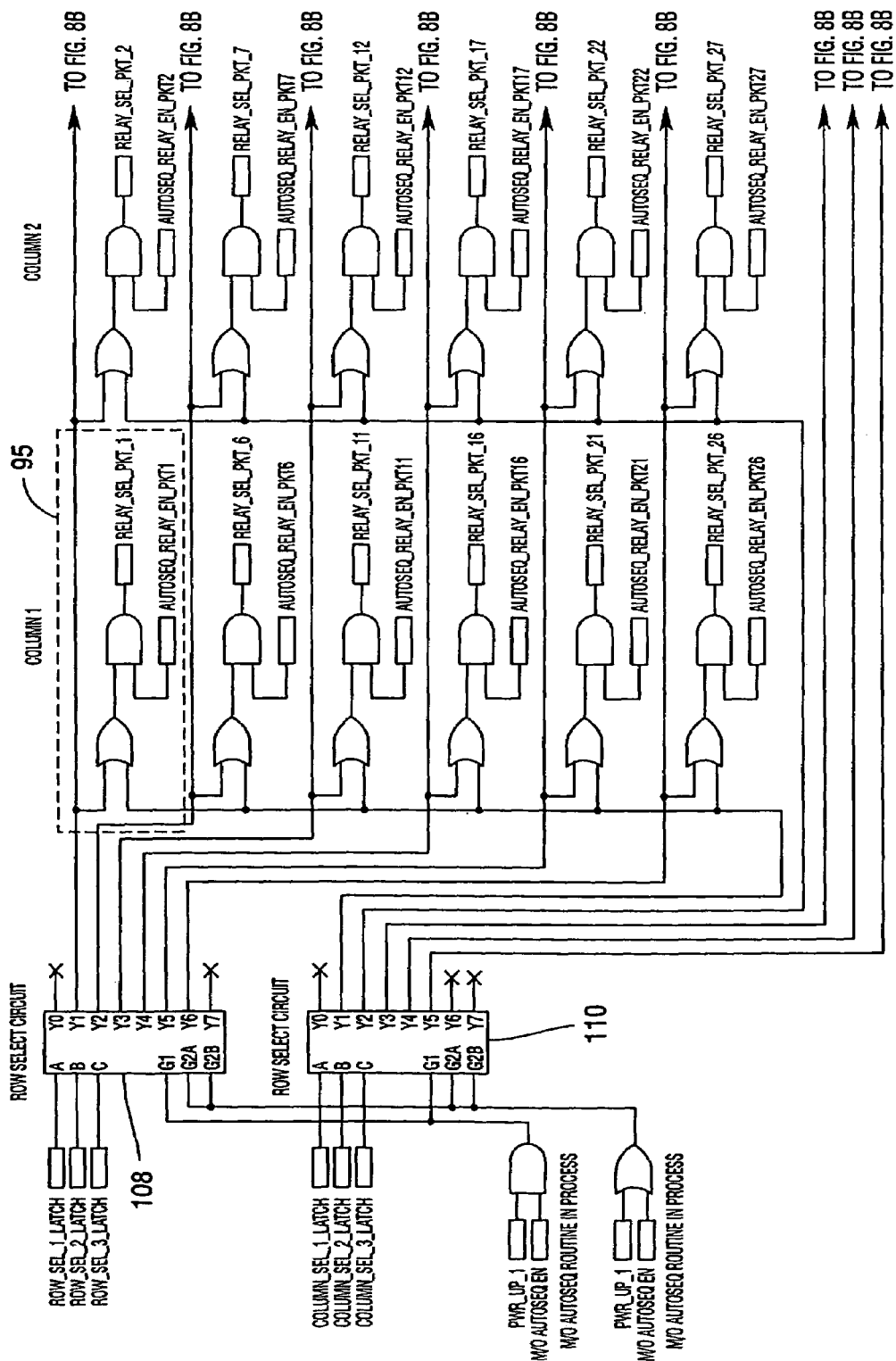
FIGS. 8A and 8B are an electrical schematic of a relay select circuit for the remote dispensing system illustrated in FIG. 1 according to an embodiment of the present invention.
Figure 8B:
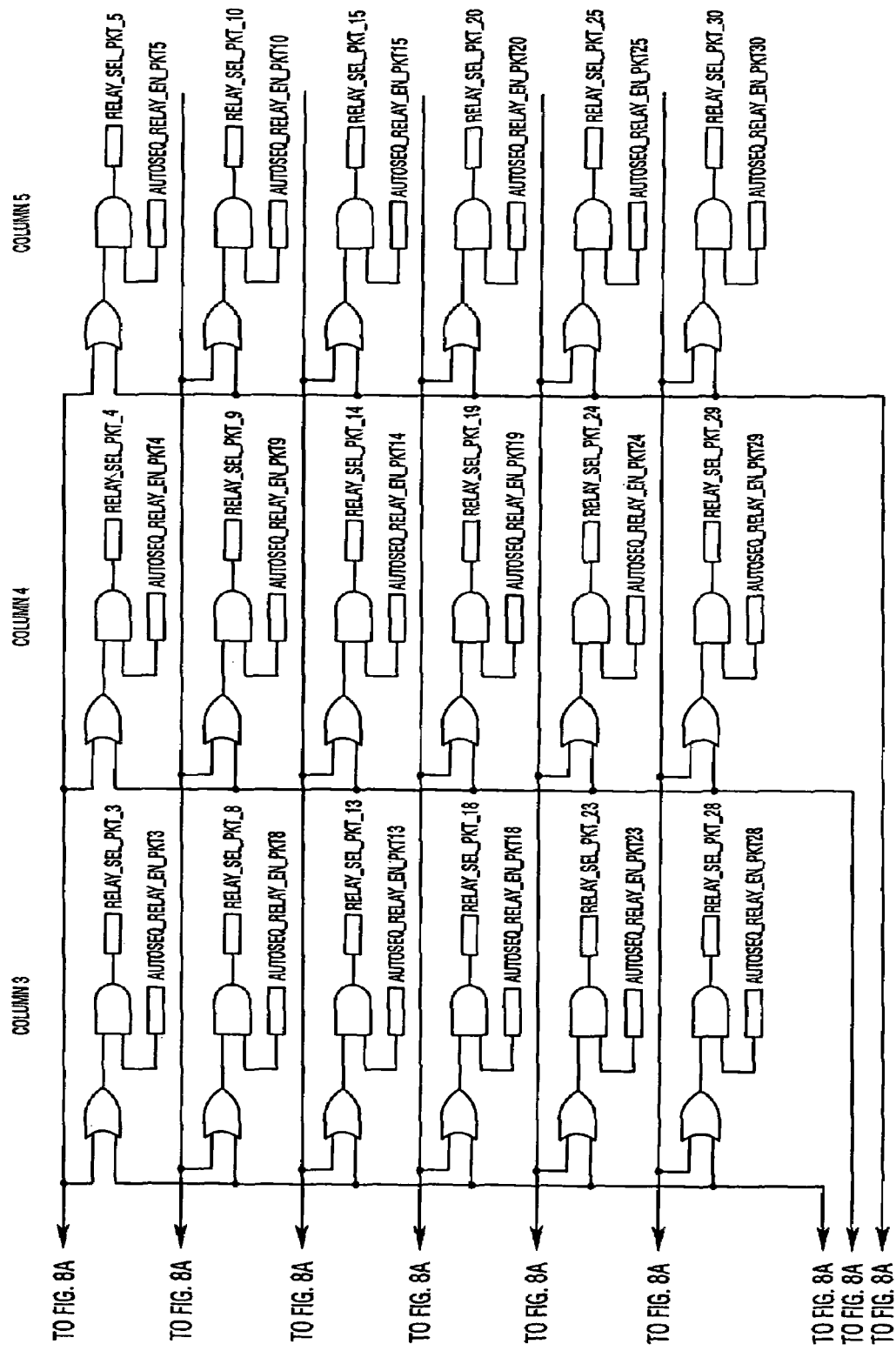

FIG. 8 is an electrical schematic of a relay select circuit 92 for the remote dispensing system 10 illustrated in FIG. 1 according to an embodiment of the present invention. In the current embodiment, the relay select circuit 92 has a row select circuit 108 and a column select circuit 110 that receive signals from the row select and column select pins 93 of the input/output interface circuit 86. The row select circuit 108 and column select circuit 110 each fire one of a plurality of output lines that feed a grid or matrix of relay circuits 95. In the current embodiment, each bin 36 in the remote dispensing station 10 has a corresponding relay circuit 95. If a given relay circuit 95 receives both a row select signal (e.g., "X") and a column select signal (e.g., "Y"), the relay for that "X-Y" coordinate is selected. The output of the relay circuit 95 is used to pulse the latching mechanism's 66 latching solenoid 70 for the desired bin 36, thus locking or unlocking the bin 36. It should be noted that an alternative relay select circuits or other circuits may be used to actuate the latching mechanism 66 for locking and unlocking the bins 36 while remaining within the scope of the present invention.

Figure 9A:
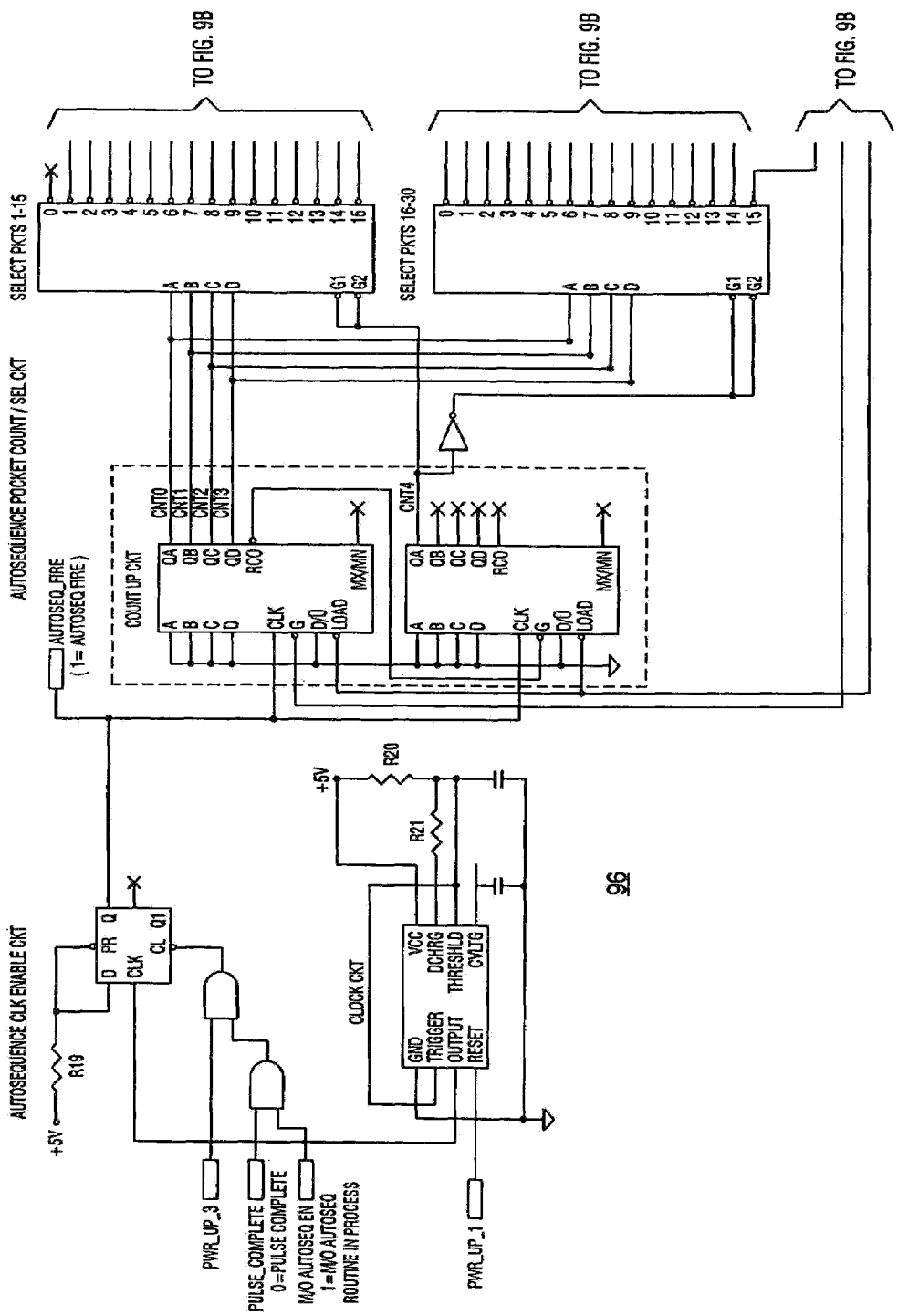
FIGS. 9A and 9B are an electrical schematic of a manual override sequence control circuit for the remote dispensing system illustrated in FIG. 1 according to an embodiment of the present invention.
Figure 9B:
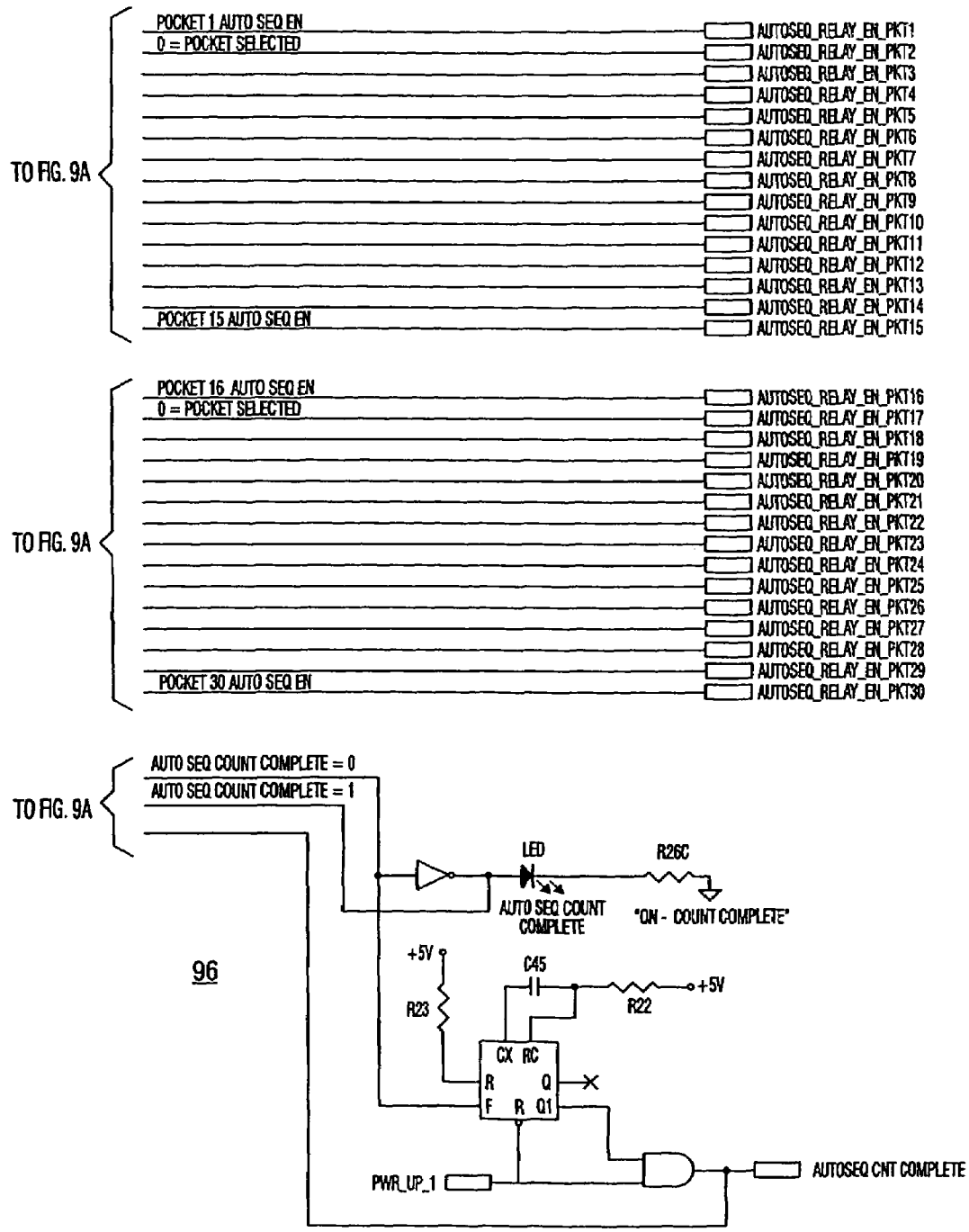

FIG. 9 is an electrical schematic of a manual override sequence control circuit 96 for the remote dispensing system 10 illustrated in FIG. 1 according to an embodiment of the present invention. The circuit of FIG. 9 is comprised of a pair of counters that enable each bin 36 of a selected drawer 26 to be separately and sequentially addressed and unlocked, before proceeding to the next drawer and separately and sequentially addressing and unlocking all of the bins 36 in that drawer 26. In this manner, the power requirements are maintained at an acceptable level. A similar scheme could be implemented with the control computer 14 if it is still functioning and an override is needed for some reasons other than a control computer 14 malfunction. It should be noted that the actual sequence employed, as well as the auto-sequence circuit used for the manual override (among others) may be varied while remaining within the scope of the present invention.

Figure 10:
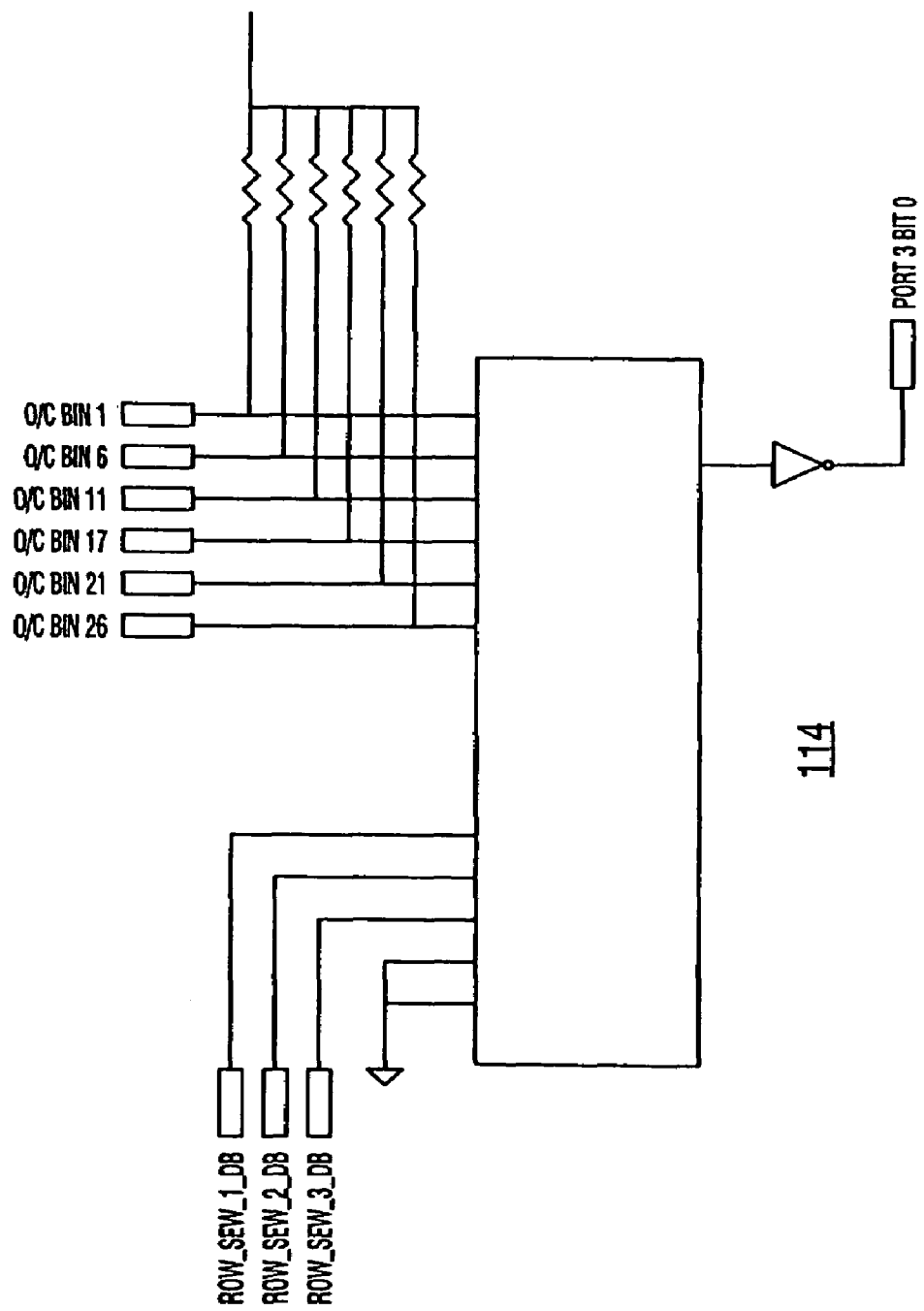
FIG. 10 is an electrical schemata of feedback circuits for the remote dispensing system illustrated in FIG. 1 according to an embodiment of the present invention.

FIG. 10 is an electrical schematic of a portion of a feedback circuit for the remote dispensing system 10 illustrated in FIG. 1 according to an embodiment of the present invention. As discussed, the latching mechanism 66 for each bin 36 produces one or more feedback signals. For example, a feedback signal may indicate that the lid 58 is opened or closed (e.g., designated as 0/C in FIG. 10). In the current embodiment, the feedback signal for the bins 36 in each column (i.e., within a drawer 26) are sent to a feedback selector 114. It should be noted that only one feedback selector 114 is shown in FIG. 10 for simplicity. Although not shown in FIG. 10, the feedback circuit includes a number of feedback selectors 114 to receive feedback from each bin 36. The output of the feedback selectors 114 are then sent to the control computer 14 (e.g., via pin PORT 3 BIT 0). It should be noted that other feedback circuits may be used while remaining within the scope of the present invention.

It should be recognized that the above-described embodiments of the invention are intended to be illustrative only. Numerous alternative embodiments may be devised by those skilled in the art without departing from the scope of the following claims.

That which is claimed:

1. An automated dispensing cabinet, comprising:
   a plurality of drawers, wherein at least one of said plurality of drawers includes a plurality of row assemblies, each of said plurality of row assemblies having a plurality of bins wherein each of said plurality of bins includes:
   a lid having a tab attached thereto;
   a touch latch operable to engage or disengage said tab when said lid is in a closed position;
   a lock assembly including a catch operable to prevent said tab and said touch latch from engaging or disengaging; and
   a mechanical indicator responsive to said lock assembly and viewable when said lid is in a closed position; and
   a control computer operable to lock and unlock said plurality of drawers and to control the position of said catch of each of said bins.

2. The automated dispensing cabinet of claim 1 wherein each of said plurality of bins further comprises:
   a front wall;
   a back wall connected to said front wall by two side walls;
   a base supporting said front wall, said back wall, and said side walls; and
   a plurality of partitions extending from said front wall to said back wall.

3. The automated dispensing cabinet of claim 2 wherein said front wall includes a lip carrying said indicator and wherein said lid is hingeably attached to said back wall.

4. The automated dispensing cabinet of claim 1 wherein said indicator further comprises:

a window located on one of said front wall, said back wall, said side wall, and said partition; and two types of indicia carried by said catch such that only one of said indicia is viewable at a time through said window.

5. The automated dispensing cabinet of claim 1 wherein said lid is comprised of a transparent material.

6. The automated dispensing cabinet of claim 1 wherein said lock assembly includes a device operable to produce a feedback signal relative to the positions of said catch and said lid, said feedback signal being sent to said control computer.

7. The automated dispensing cabinet of claim 1 wherein said control computer includes:

an input device; and an output device.

8. The automated dispensing cabinet of claim 7 wherein said input device is one of a keyboard, a touch screen, a datalink, and scanning device.

9. The automated dispensing cabinet of claim 7 wherein said output device is one of a display, printer, and datalink.

10. The automated dispensing cabinet of claim 1 wherein said lock assembly includes means for moving said catch, said catch carrying two types of indicia representative of whether said catch is engaged or disengaged relative to said tab.

11. The automated dispensing cabinet of claim 10 wherein said means for moving includes one of a solenoid, a latching solenoid, a motor, a pneumatic cylinder, a hydraulic cylinder, an actuator, and an electromagnet.

* * * * *